(12) United States Patent
Stewart et al.

(10) Patent No.: US 7,764,667 B1
(45) Date of Patent: Jul. 27, 2010

(54) SYSTEM AND METHOD FOR INTEGRATION OF THIN CLIENT AND VOICE OVER IP

(75) Inventors: Graham W. Stewart, Erie, CO (US); Michael P. Dejonge, Golden, CO (US); Kirk D. Pearson, Broomfield, CO (US)

(73) Assignee: Oracle America, Inc., Redwood City, CA (US)

( * ) Notice: Subject to any disclaimer, the term of this patent is extended or adjusted under 35 U.S.C. 154(b) by 1142 days.

(21) Appl. No.: 11/133,765

(22) Filed: May 20, 2005

(51) Int. Cl.
*H04L 12/66* (2006.01)
*G06F 15/16* (2006.01)

(52) U.S. Cl. ..................... 370/352; 709/229
(58) Field of Classification Search ......... 370/260–267, 370/432, 458, 460, 468; 379/202.01, 204.01; 709/229
See application file for complete search history.

(56) References Cited

U.S. PATENT DOCUMENTS

| | | | |
|---|---|---|---|
| 6,442,609 B1 * | 8/2002 | Lambert et al. ............. 709/227 |
| 6,885,660 B2 * | 4/2005 | Inbar et al. ................. 370/352 |
| 7,376,129 B2 * | 5/2008 | Acharya et al. ............. 370/352 |
| 7,451,921 B2 * | 11/2008 | Dowling et al. ............. 235/380 |
| 2004/0264439 A1 * | 12/2004 | Doherty et al. ............. 370/352 |

* cited by examiner

*Primary Examiner*—Curtis Kuntz
*Assistant Examiner*—Mohammad K Islam
(74) *Attorney, Agent, or Firm*—Marsh Fischmann & Breyfogle LLP; Kent A. Lembke; Michael L. Gencarella

(57) ABSTRACT

A system providing access and use of customized telephony properties anywhere within a network is provided. The system includes a gateway to a telephone network. The gateway stores telephony data unique to each client. A server in communication with the gateway and a plurality of clients is included. The server executes a VoIP application through which the server and the gateway communicate. An instance of the VoIP application is created for each client establishing a session with the server, wherein the gateway creates a mapping table having entries associating the data unique to each client with the session for the corresponding client. A method for providing transferable telephony properties is also provided.

10 Claims, 3 Drawing Sheets

SYSTEM AND METHOD FOR INTEGRATION OF THIN CLIENT AND VOICE OVER IP

BACKGROUND

The "thin-client" network continues to gain wider acceptance among users. Under the thin client architecture, the thin client performs minimal processing, and stores little or no data. The thin client is employed to provide a graphical user interface and to display data and information generated by the server. The interface communicably couples the thin client to the server. The server provides the processing power and data storage that is required by the respective thin client. A user may log onto any thin client machine connected to the server and the server, which may store the applications software and the user's data and desktop, provides the user with their customary operating environment associated with that user. The server performs all the data processing and data storage functions. The thin client provides only the user interfaces to display graphics, text, and data, and to receive user input data. The ability of a user to log onto any one of a plurality of thin clients and obtain access to his usual desktop and computational configuration is referred to as "hot desking."

A thin client network architecture offers several advantages over traditional client-server network architectures. One advantage of the thin client network is that a user can access their desktop features including their personal software, data, and tools from the server from any thin-client machine in the network. Flexibility is therefore afforded, since multiple users may utilize a single thin-client machine at different times during the day depending on individual schedules, work hours and needs. In addition, a user may select a different thin client machine to use each day, depending on the availability of the machines. This flexibility may result in better asset management, a higher availability of machines, and a concomitant increase in productivity and efficiency of the users. From the end user perspective the experience is no different from having their own system. However system administrators now have to maintain a tiny fraction of the number of systems, keeping costs down.

Thin client systems provide other benefits to the user. The working session now resides in a data center on a very reliable machine. The data can be backed up regularly without any involvement on the part of the user. Another bonus is that user's sessions can be identified by a smart chip (often on their ID badge) and they can access their session by inserting their badge into any thin client. Alternatively, a user may access the thin client through a password or any other suitable access means. This enables paradigms such as "hot-desking," since users can sit down at any desk, insert their badge and carry on working where they left off.

However, while a session is portable under the thin client architecture, most office phone systems fail to provide anything remotely similar. Thus, when a user sits at a desk that is not his own, the user will have to set up forwarding to have phone calls forwarded to him. The set up process usually requires the user to navigate through a menu to set up the forwarding information. If the user should move to a different location this set up process must be repeated. Additionally, with caller identification being ubiquitous, since the user is not at his own phone number, when the user makes a phone call the receiving party would not recognize the phone number for the incoming call.

As a result there is a need to enable a user to integrate telephony features into the thin client architecture.

SUMMARY

Embodiments of the present invention provide an apparatus and method for integrating the thin client architecture with the phone network. The present invention can be implemented in numerous ways, including as a method or a system. Several embodiments of the present invention are described below.

A system providing access and use of customized telephony properties anywhere within a network is provided. The system includes a gateway to a telephone network. The gateway stores telephony data unique to each client. In one embodiment, the gateway is a Voice over Internet Protocol (VoIP) server. A server in communication with the gateway and a plurality of clients is included. The server executes a VoIP application through which the server and the gateway communicate. An instance of the VoIP application is created for each client establishing a session with the server. The gateway creates a mapping table having entries associating the data unique to each client with the session for the corresponding client. Through the embodiments described below a "hot phoning" paradigm is enabled as a user may sit at any thin client, logon to the system and have their phone calls forwarded to the desk without any intervention on the user's part.

Other aspects of the invention will become apparent from the following detailed description, taken in conjunction with the accompanying drawings, illustrating by way of example the principles of the invention.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION

A system and method that enables a user to place and receive phone calls through a handset or head set connected to a thin client is provided. The ability to seamlessly move a user's phone/phone number within the framework of a thin client architecture is discussed herein. The embodiments direct a user's phone calls to the user depending where on the system the user is logged on. A user is authenticated during a logon procedure. In one embodiment, the logon occurs as a consequence of the insertion of a smart card in a smart card reader coupled to the respective client and providing a user name/password. Of course, other suitable techniques for identifying the user may be provided, e.g., biometric authentication of the user, a user name and/or password, and any other known logon techniques. Once the user is authenticated and a session begins, software maps the Universal Serial Bus (USB) port of the client to the user. It should be appreciated that when referring to a computer system, the various components of the computer system may be located remotely from one another and accessed via a network in one embodiment of the invention.

Figure 1:
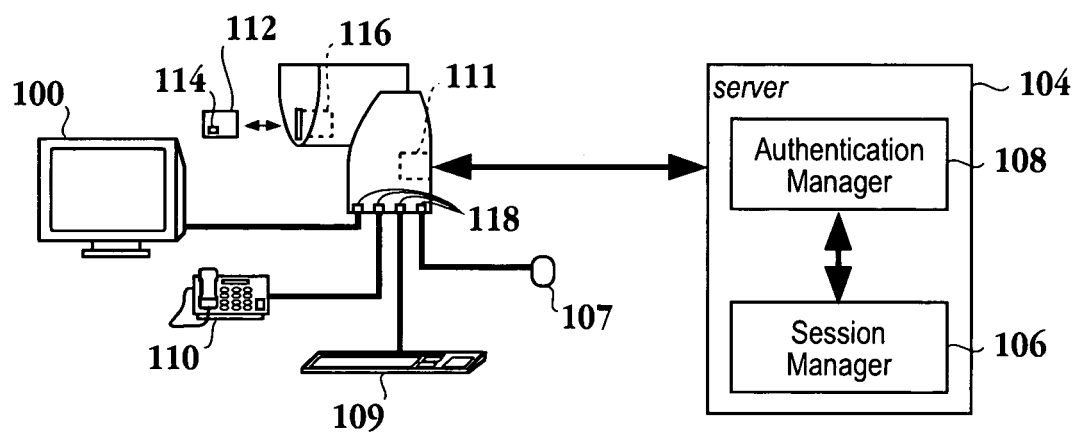
FIG. 1 is a simplified schematic diagram illustrating a thin client architecture having Voice over Internet Protocol (VoIP) capability in accordance with one embodiment of the invention.

FIG. 1 is a simplified schematic diagram illustrating a thin client architecture having Voice over Internet Protocol (VoIP) capability in accordance with one embodiment of the invention. The system includes thin client having a display 100. Thin client is configured to accept card 112. It should be appreciated that card 112 may include processor 114 thereon. In one embodiment, smart card 112 is a JAVA™ card available from the assignee. Integrated within thin client is card reader 116. Handset 110 is connected to thin client through port 118. In one embodiment, port 118 is a universal serial bus (USB) port. It should be appreciated that thin client may include four USB ports in one embodiment. A keyboard and/or mouse may be connected through the additional USB ports. Server 104 is in communication with thin client. Authentication manager 108 and session manager 106 reside on server 104. Authentication manager 108 is responsible for enforcing the authentication policies for the thin client. Each time a user tries to access the system by authenticating using a token, which is contained on smart card 112, thin client will query authentication manager 108. If the token unique ID is recognized in a database associated with server 104, then authentication manager 108 will determine whether the user has a live session or not. Whether or not the user has a live session is provided through session manager 106. In one embodiment, to gain access to thin client, the authentication process requires a user to have an authorized log in and a password combination in conjunction with an authorized smart card. Thus, a two-factor authentication process is used, where the two factors include something a user knows, i.e., the log in and password combination and something the user has, i.e. the smart card.

Still referring to FIG. 1, one skilled in the art will appreciate that smart card 112 is basically a credit-card sized plastic card with one or more embedded integrated circuit chips thereon. In one embodiment, the card acts as a miniature computer with an operating system, random access memory, and electrically erasable programmable read-only memory (EEPROM). The hardware components that make up the thin client include monitor 100, keyboard 109, mouse 107, graphics card (not shown), integrated smart card reader 116, and network interface card 111. All software components are centrally managed, maintained, and updated on server 104. In one embodiment, the architecture presented in FIG. 1 is that of the SUN RAY™ appliance available from the assignee. Additionally, multiple thin clients 102 may be associated with server 104. There may also be multiple interconnected servers and the multiple servers may be located on different campuses, i.e., located in different geographical locations. The ability to exactly and instantly access the user's session from any appliance on any of the associated server groups may be referred to as "hot desking." This feature allows a user to remove their smart card, after establishing a session, and effectively disconnect the user's session on the thin client suspending the session on the server, and giving the user the ability to regain their session simply by inserting the smart card into another thin client. Session manager 106 manages the user's sessions. Session manager 106 signals the services to allow all input/output processing to the appropriate thin client when a user reconnects or starts a new session. Similarly, session manager 106 sends a signal to stop all services input/output processing when the user disconnects from thin client. It should be appreciated that authentication manager 108 and session manager 106 are running at all times for thin client to operate.

Because thin client is stateless, a user session can be redirected to a thin client desktop unit on the appropriate network or sub network when the user logs in or inserts smart card 112. The session, in essence, follows the user to a new thin client. The embodiments described herein integrate the thin client software with existing telephone networks. The telephony settings are stored on smart card 112 for a particular user. Thus, parallel to "hot desking" the embodiments described herein enable "hot phoning," where a user's telephony settings are transferable to each of the thin clients.

Figure 2:
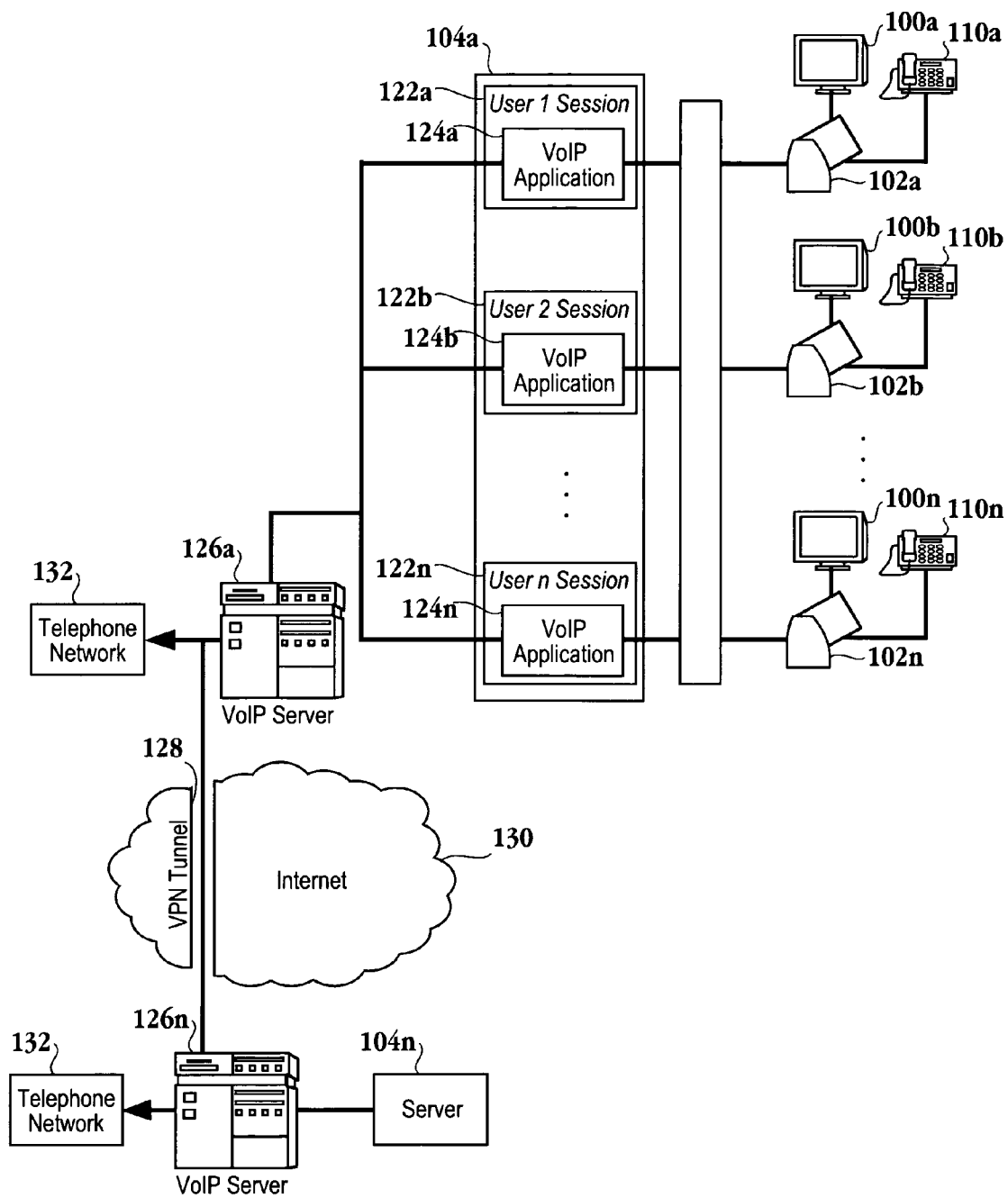
FIG. 2 is a simplified schematic diagram illustrating a more detailed representation of the thin client architecture integrated with a telephone network in accordance with one embodiment of the invention.

FIG. 2 is a simplified schematic diagram illustrating a more detailed representation of the thin client architecture integrated with a telephone network in accordance with one embodiment of the invention. Thin clients 102a through 102n are in communication with server 104a. As illustrated, thin client 102a is communicably operable with display 100a and handset 110a. Similarly, thin client 102b is in communication with display 100b and handset 110b. This configuration can be duplicated for any number of thin clients. Server 104a executes a user session once a user has been authenticated through the appropriate thin client. Within user session 122a, which is associated with thin client 102a, runs VoIP application 124a. Likewise, for a second user session 122b the corresponding VoIP application 124b runs within the second user session. Each VoIP application 124a-n is in communication with VoIP server 126a. VoIP server 126a is in communication with telephone network 132, which may be a private branch exchange (PBX) or a public switched telephone network (PSTN). Additionally, VoIP server 126a may be in communication with another VoIP server 126n over Internet 130 through virtual private network (VPN) tunnel 128. Thus, multiple campuses in different geographical locations may be connected through this architecture so that a user traveling in any of the locations will still have access to his session. It should be appreciated that between campuses phone lines may also be used for communication, however, charges may be incurred when using the phone lines. While FIG. 2 illustrates server 104a separate from server 126a, it should be appreciated that this is not meant to be limiting. In one embodiment, server 126a and 104a may be integrated into a single server.

It should be further appreciated that VoIP provides the capability to place and receive calls using a computer network. The VoIP software applications 124a through 124n running as part of each user's session allows the corresponding user to place and receive calls using a handset or headset 110a through 110n connected to a particular thin client 102a through 102n. As mentioned above, thin clients 102a through 102n are capable of accepting peripherals through the USB ports contained on the thin clients. Therefore, with a suitable device driver it is possible to connect a USB handset/headset to thin clients 102a through 102n. It should be noted that the handset/headset may also be referred to as a telephone appliance. One exemplary handset that may be connected is the cyber phone K commercially available from SKYPE. However, any suitable handset or head set that can capture a user's voice and provide an audio signal may be used here, as the embodiments are not limited to a particular phone type or style. Accordingly, the telephone appliances may be coupled to the respective thin clients 102a-n via a USB interface, a serial interface or a parallel interface. Additional methods of coupling the telephone appliances to respective clients 102a-n such as an infrared link, a wireless Rf link, or other electro-optical coupling may be used as well.

Still referring to FIG. 2, VoIP server 126a through 126n act as VoIP gateways. That is, the system acts as an interface for the software VoIP phones with the phone network 132. In one embodiment, when a user logs out, by removing their smart card from the corresponding thin client, the software running on server 104a-n would no longer be able to see the handset attached to the corresponding thin client. In this case, the software would redirect any calls to the corresponding user to voice mail, a cell phone, e-mail, or some other suitable default. One skilled in the art should appreciate that through the embodiments described herein a user's calls can always be forwarded to the desk where they are working without any intervention on their part. Thus, a user will not have to go through a menu in order to re-direct their phone calls or re-set the phone in order to accommodate a user moving offices. In addition, when users are away from their desk, their calls will automatically forward to voice mail, a cell phone, or email, depending on the default set when the user is not logged into the system. In addition, each desk will only require a single network cable, since phone calls will be transmitted alongside computer data. Therefore, the phone system as currently used may be eliminated. Calls between software phones will be handled completely by the data network and for geographically diverse companies this would eliminate long distance and international rates. One other benefit of the above-described system is that when the user is making a call to another party, the outgoing call will appear as emanating from the user rather than an unknown phone line where the receiving party has caller identification capability.

Figure 3:
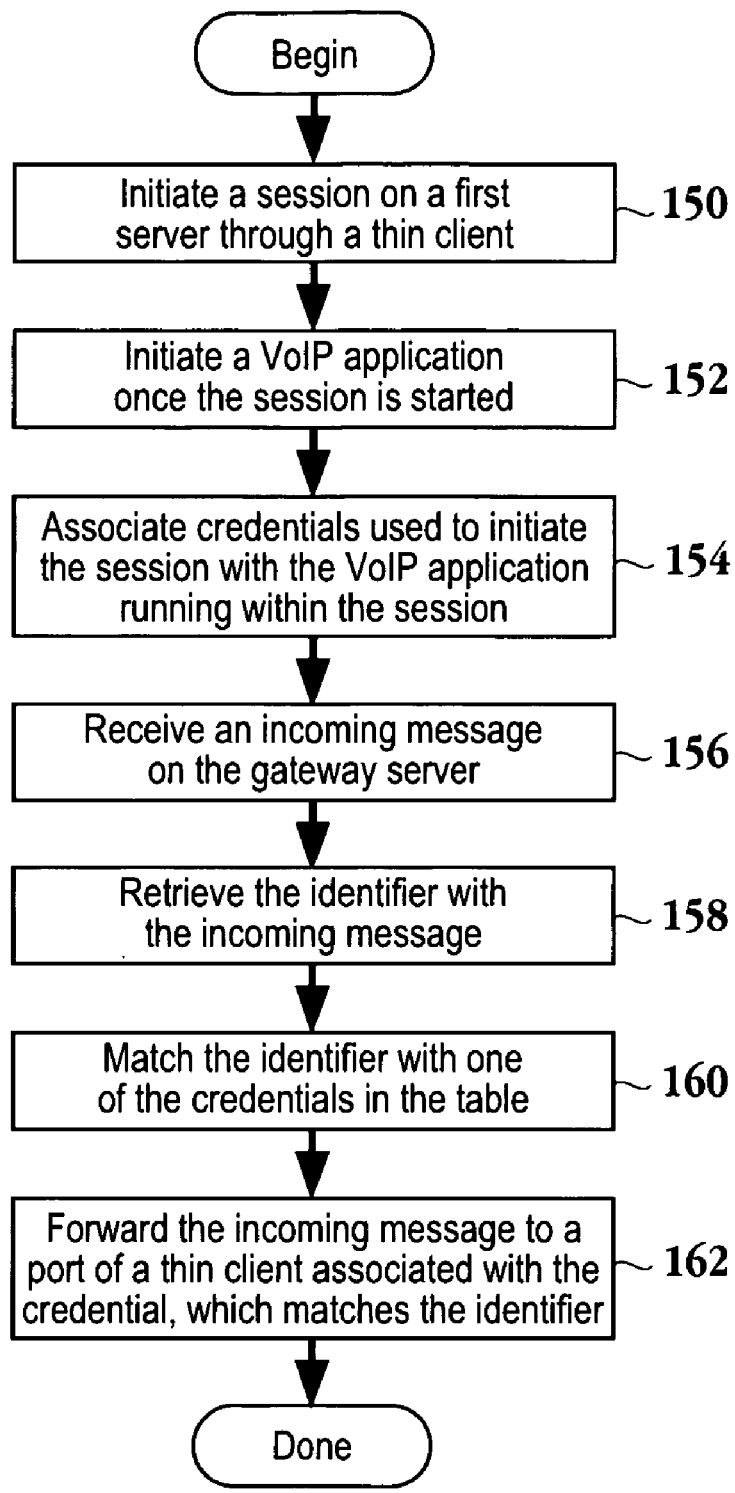
FIG. 3 is a flow chart diagram illustrating a method for providing transferable telephony properties in accordance with one embodiment of the invention.

FIG. 3 is a flow chart diagram illustrating a method for providing transferable telephony properties in accordance with one embodiment of the invention. The method starts with operation 150 where a session on a first server is initiated through a thin client. As mentioned above, a user may initiate a session by inserting a smart card into a thin client and authenticating through the authentication manager to initiate a session. Once the session is started a VoIP application is initiated in operation 152. The VoIP application provides a communication link between a server running this application and a server acting as a gateway to the phone network. The method then proceeds to operation 154 where credentials used to initiate the session are associated with the VoIP application running within the session. In one embodiment, this association occurs on the gateway server, i.e., the VoIP server of FIG. 2. The credentials may include a user's unique identification, e.g., a user name, and/or a telephone extension. In one embodiment of the invention, the association of the credentials with the VoIP application occurs through a table in which the appropriate data is mapped. In one embodiment, system administrators would set up a mapping. Most likely this would take the form of a table such as:

Extension a <-> User a
Extension b <-> User b
etc....

These extensions may then map to outside numbers as depicted below:

Extension a <-> Direct Dial Number a

It should be appreciated that the direct dial number is not necessary as the user may be identified through the information on a smart card. A third table, when both of the above mentioned tables are utilized, would be generated by the VoIP server. This third table would associate sessions with users, and would likely be done in operation 154. Therefore, joining these tables would allow calls to be routed to the appropriate user.

The method of FIG. 3 then proceeds to operation 156 where an incoming message is received on the gateway server. In one embodiment, the incoming message is received from a packet switching network. This packet data will have header information. The header information includes an identifier associated with the incoming message. In operation 158 the identifier associated with the incoming message is retrieved. The method then proceeds to operation 160 where the identifier is matched with one of the credentials in the table discussed above with reference to operation 154. In operation 162, the incoming message is forwarded to a port of a thin client associated with the credential, which matches the identifier. As mentioned previously, if a user ends his session and is no longer logged onto the system, the incoming message may be forwarded to voice mail, a cell phone, email, or some other suitable default identified for the user.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Embodiments of the present invention can be processed on a single computer, or using multiple computers or computer components which are interconnected. A computer, as used herein, shall include a standalone computer system having its own processor, its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

The above-described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data, which thereafter can be read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be obvious to one skilled in the art that the present invention may be practiced without some or all of these specific details. In other instances, well known process operations have not been described in detail in order not to unnecessarily obscure the present invention. Furthermore, although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A system having Voice over Internet Protocol (VoIP) capability, comprising:
   a stateless client computing device having a voice input device connected thereto, the voice input device configured to convert an analog audio signal to digital data;
   a first server device located remotely from and in communication over a network with the stateless client computing device, the first server device operating to serve,
      an authentication manager configured to authenticate access to use the stateless client computing device; and
      a session manager configured to establish a session subsequent to access authentication, wherein the session manager runs a VoIP application within the session; and
   a second server device separate from and in communication with the first server device over a network, the second server device functioning as a VoIP gateway to provide an interface between a telephone network and the VoIP application executing within the session on the first server device, wherein the stateless client computing device is operable to access the telephone network without running the VoIP application on the stateless client computing device.

2. The system of claim 1, wherein the voice input device is connected to the stateless client computing device through a Universal Serial Bus port.

3. The system of claim 1, wherein the stateless client computing device is accessed through a smart card, the smart card providing authentication data and session data to the first server through the stateless client computing device.

4. The system of claim 1, wherein the first server device maintains a table mapping a user to a corresponding extension.

5. The system of claim 2, wherein the voice input device is one of a handset or a headset.

6. The system of claim 1, further comprising:
   a telephone network in communication with the second server device, the telephone network including one of a private branch exchange or a public switched telephone network.

7. The system of claim 1, further comprising:
   a third server in communication with the second server device over a distributed network, the third server in a different geographical location than the second server device, the third server initiating a VoIP application to be executed within a session of another system.

8. The system of claim 1, wherein the authentication manager implements a two factor authentication operation.

9. The system of claim 8, further comprising:
   a card reader in communication with the stateless client, the card reader configured to accept a smart card having a unique identifier providing one factor of the two factor authentication operation.

10. The system of claim 3 wherein the stateless client computing device includes a card reader integrated therein.

* * * * *